US012771245B2

(12) United States Patent
Du et al.

(10) Patent No.: US 12,771,245 B2
(45) Date of Patent: Oct. 20, 2026

(54) RESONANT CONVERTER DYNAMIC CONTROL SYSTEM AND METHOD THEREOF

(71) Applicant: Aplus Power Technology (Hangzhou) Co., Ltd., Hangzhou City (CN)

(72) Inventors: Shuailin Du, Hangzhou City (CN); Junhao Ji, Hangzhou City (CN)

(73) Assignee: Aplus Power Technology (Hangzhou) Co., Ltd., Hangzhou City (CN)

( * ) Notice: Subject to any disclaimer, the term of this patent is extended or adjusted under 35 U.S.C. 154(b) by 184 days.

(21) Appl. No.: 18/666,080

(22) Filed: May 16, 2024

(65) Prior Publication Data

US 2024/0388200 A1 Nov. 21, 2024

(30) Foreign Application Priority Data

May 17, 2023 (CN) ......................... 202310572009.9

(51) Int. Cl.
*H02M 3/00* (2006.01)
*H02M 3/335* (2006.01)

(52) U.S. Cl.
CPC ....... *H02M 3/015* (2021.05); *H02M 3/33569* (2013.01); *H02M 3/33571* (2021.05)

(58) Field of Classification Search
CPC .......................... H02M 3/015; H02M 3/33571
See application file for complete search history.

(56) References Cited

U.S. PATENT DOCUMENTS 11,005,363 B1 * 5/2021 Wongsasulux ...... H02M 1/0009
11,258,368 B2 * 2/2022 Jiang .................. H02M 1/0016
(Continued)

FOREIGN PATENT DOCUMENTS

CN 108448897 B 5/2020
CN 112615546 B 12/2021
(Continued)

OTHER PUBLICATIONS

Li Shanshou et al., "Research on bidirectional CLL resonant converter with wide voltage gain range," Journal of Guangxi University of Science and Technology, vol. 34, No. 1, Mar. 2023, 10 pages. [English abstract provided].

*Primary Examiner* — Gary A Nash
(74) *Attorney, Agent, or Firm* — Hanley, Flight & Zimmerman, LLC

(57) ABSTRACT

Embodiments of the present application provide a resonant converter dynamic control system and a method thereof, the system comprising a resonant converter, a sampling circuit connected to the resonant converter, and a control circuit connected to the sampling circuit and the resonant converter respectively; the sampling circuit is used for acquiring and transmitting an output voltage signal, an output current signal and a charge integration signal of the resonant converter to the control circuit; the control circuit is used for generating a control signal to control power transmission of the resonant converter according to the output voltage signal, the output current signal, a benchmark reference value and the charge integration signal, wherein the benchmark reference value is calculated based on resonant frequency of the resonant converter. The present application can effectively improve the dynamic control performance of the resonant converter.

17 Claims, 5 Drawing Sheets

(56) References Cited

U.S. PATENT DOCUMENTS

| | | | | |
|---|---|---|---|---|
| 2014/0225439 | A1* | 8/2014 | Mao | H02J 50/12 307/31 |
| 2016/0087543 | A1* | 3/2016 | Jin | H02M 1/38 363/21.03 |
| 2019/0044430 | A1* | 2/2019 | Moon | H02M 3/3376 |

FOREIGN PATENT DOCUMENTS

| | | | |
|---|---|---|---|
| CN | 114337307 | A | 4/2022 |
| CN | 114362544 | A | 4/2022 |
| CN | 115714540 | A | 2/2023 |

* cited by examiner

RESONANT CONVERTER DYNAMIC CONTROL SYSTEM AND METHOD THEREOF

CROSS-REFERENCE TO RELATED APPLICATIONS

This application claims priority to Chinese Patent Application No. 202310572009.9, filed on May 17, 2023, which is hereby incorporated by reference in its entirety.

TECHNICAL FIELD

The present application relates to the field of electric energy control, and in particular to a resonant converter dynamic control system and a method thereof.

BACKGROUND

At present, in the whole field of switch power supply, a resonant converter can realize soft switching and high efficiency, and thus is widely applied. The resonant converter mainly adopts frequency control to realize the gain change of the resonant converter.

SUMMARY

Such solution has the following disadvantages: because the frequency control is an indirect control, there is no direct correspondence between working state of a resonant converter circuit and frequency, for example, current and voltage of a resonant tank are load dependent, the frequency control can not directly control the state of the resonant tank, thus when the load is dynamic, the state of the resonant tank changes with the frequency, and does not change according to the load, which then affects regulation of the output voltage.

Aiming at the problems in the prior art, the present application provides a resonant converter dynamic control system and a method thereof, which can effectively improve the dynamic control performance of the resonant converter.

In order to solve at least one of the above problems, the present application provides the following technical solutions:

In an aspect, the present application provides a resonant converter dynamic control system, comprising a resonant converter, a sampling circuit connected to the resonant converter, and a control circuit connected to the sampling circuit and the resonant converter respectively;

- the sampling circuit is used for acquiring and transmitting an output voltage signal, an output current signal and a charge integration signal of the resonant converter to the control circuit;
- the control circuit is used for generating a control signal to control power transmission of the resonant converter according to the output voltage signal, the output current signal, a benchmark reference value and the charge integration signal, wherein the benchmark reference value is calculated by resonant frequency of the resonant converter.

In another aspect, the present application provides a resonant converter dynamic control method, comprising:

- acquiring an output voltage signal, an output current signal and a charge integration signal of a resonant converter;
- generating a control signal to control power transmission of the resonant converter according to the output voltage signal, the output current signal, a benchmark reference value and the charge integration signal, wherein the benchmark reference value is calculated by resonant frequency of the resonant converter.

In yet another aspect, the present application provides an electronic device, including a memory, a processor, and a computer program stored on the memory and executable on the processor, wherein the processor, when executing the program, implements steps of the resonant converter dynamic control method.

It can be seen from the above technical solutions that the present application provides a resonant converter dynamic control system and a method thereof, which can effectively improve the dynamic control performance of the resonant converter by adding the feedforward control of judgment to compensate for difference between an input power and an output power in the dynamic regulation process, as well as power difference caused by output current sampling and control delay.

BRIEF DESCRIPTION OF THE DRAWINGS

To illustrate more clearly the embodiments of the present application or the technical schemes of the prior art, a brief description of the accompanying drawings in the embodiments or the prior art will be given below. Obviously, the accompanying drawings described below are some embodiments described in this application. For those of ordinary skill in the art, other drawings can also be obtained without any creative labor from these drawings.

DETAILED DESCRIPTION

In order to more clearly explain purpose, technical solution and advantages of the embodiment of the present application, hereinafter the technical solution in the embodiments of the present application will be described clearly and integrally in combination with the accompanying drawings in the embodiments of the present application, and obviously the described embodiments are merely part of the embodiments, not all of the embodiments. Any other embodiment obtained by those skilled in the art based on the embodiments of the present application without paying any creative labor fall within the protection scope of the present application.

Because the frequency control of an LLC resonant converter can not directly control the state of the resonant tank, when the load is dynamic, the state of the resonant tank changes with the frequency, and does not change according to the load, which then affects regulation of the output voltage. Accordingly, a control method based on resonant tank charge is proposed, which is based on the current integration of the resonant tank, can reflect the state of the load, and then directly adjust the reference value of the resonant tank charge according to the change of the load, and compare the reference value with the actual resonant tank charge, so as to realize cycle-by-cycle control of the resonant tank state and adjust the switching frequency of the LLC resonant converter.

However, in the process of dynamic regulation based on the control of the resonant tank charge, for example, when load changes from light load to the heavy load, the frequency becomes low at first and then becomes high. If merely a method of performing load feedforward is adopted, from the energy point of view, the energy of each cycle is the same, but from the power point of view, the power becomes small at first and then becomes high. In this process, there is a difference between the input power and the output power, resulting in a drop of the output voltage. For the case of small dynamic or slow change, the control process has little impact to the dynamic performance, and for the case of large dynamic and fast change, the control process has little impact to the dynamic effect. In view of the problems existing in the prior art, the present application provides a resonant converter dynamic control system and a method thereof, which can effectively improve the dynamic control performance of the resonant converter by adding the feedforward control of judgment to compensate for difference between an input power and an output power in the dynamic regulation process, as well as power difference caused by output current sampling and control delay.

Figure 1:
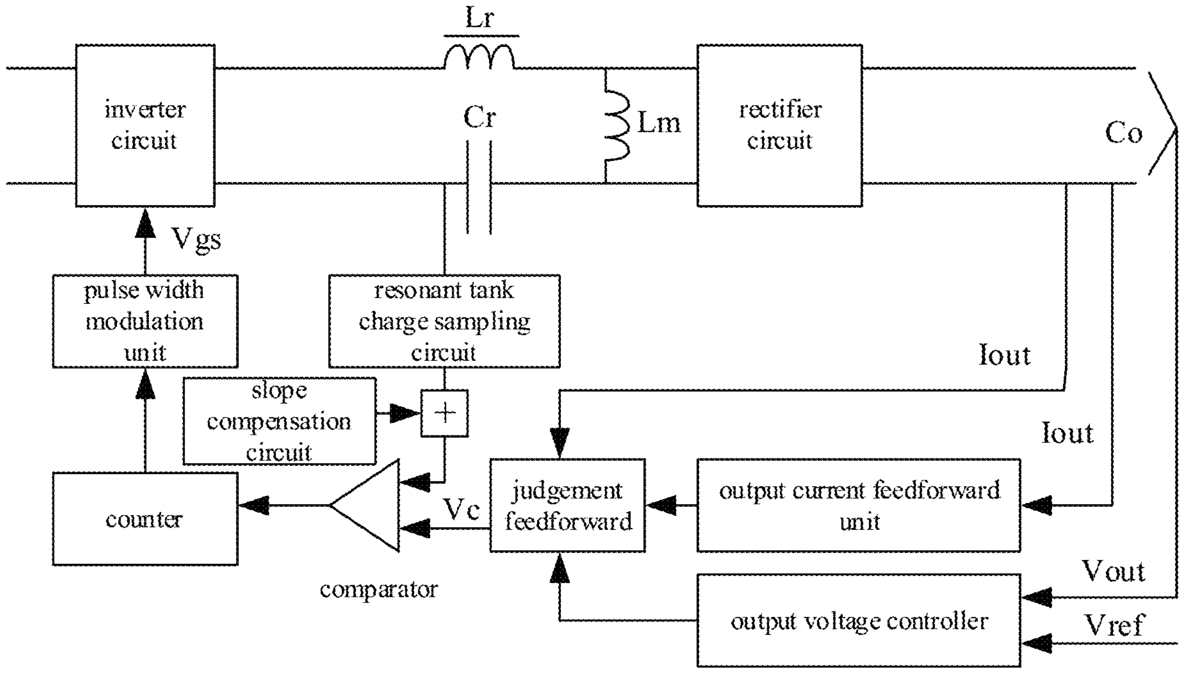
FIG. 1 is a structural diagram of a resonant converter dynamic control system in an embodiment of the present application.

In order to be able to effectively improve the dynamic control performance of the resonant converter, the present application provides an embodiment of a resonant converter dynamic control system for implementing all or part of the resonant converter dynamic control method. Referring to FIG. 1, the resonant converter dynamic control system specifically comprises the following contents:

a resonant converter, a sampling circuit connected to the resonant converter, and a control circuit connected to the sampling circuit and the resonant converter respectively;

the sampling circuit is used for acquiring and transmitting an output voltage signal, an output current signal and a charge integration signal of the resonant converter to the control circuit;

the control circuit is used for generating a control signal to control power transmission of the resonant converter according to the output voltage signal, the output current signal, a benchmark reference value and the charge integration signal, wherein the benchmark reference value is calculated based on resonant frequency of the resonant converter.

It can be seen from the above description that the resonant converter dynamic control system provided in an embodiment of the present application can effectively improve the dynamic control performance of the resonant converter by adding the control of judgment feedforward of the benchmark reference value to compensate for difference between an input power and an output power in the dynamic regulation process, as well as power difference caused by output current sampling and control delay.

In an embodiment of the resonant converter dynamic control system of the present application, the control circuit is specifically used for generating an analog reference voltage according to the output voltage signal, the output current signal and the benchmark reference value when it is determined that the output current signal is out of a light load mode; and for transmitting the control signal to the resonant converter to control power transmission of the resonant converter according to a comparison result of the charge integration signal and the analog reference voltage.

Seen as such, in the present application, the dynamic control performance of the resonant converter can be improved by acquiring the output voltage signal, the output current signal and a benchmark reference value to generate an analog reference voltage, and performing comparison between the analog reference voltage and the acquired charge integration signal of the resonant tank so as to compensate for difference between an input power and an output power in the dynamic regulation process, as well as power difference caused by output current sampling and control delay.

In an embodiment of the resonant converter dynamic control system of the present application, the sampling circuit includes: an output voltage sampling circuit, an output current sampling circuit and a resonant tank charge sampling circuit;

An input end of the output voltage sampling circuit and an input end of the output current sampling circuit are respectively connected to an output end of the resonant converter, and the resonant tank charge sampling circuit is connected to the resonant tank of the resonant converter. The resonant tank charge sampling circuit is used for detecting the current integration of the resonant tank in half cycle, and the resonant tank charge sampling circuit includes a slope compensation circuit, the charge integration signal is obtained by adding the slope compensation and charge obtained by current integration of the resonant tank in half cycle.

Seen as such, in the present application, the output voltage signal and the output current signal of the resonant converter are accurately monitored by the output voltage sampling circuit and output current sampling circuit provided at the output end of the resonant converter, and meanwhile the resonant tank charge signal is monitored by the resonant tank charge sampling circuit provided in the resonant tank of the resonant converter.

Figure 2:
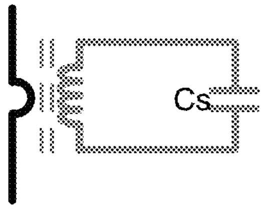
FIG. 2 is one of the structural diagrams of a resonant tank charge sampling circuit in a specific embodiment of the present application.

Alternatively, the resonant tank charge sampling circuit of the present application can be implemented in the following ways:

Referring to FIG. 2, the first type of resonant tank charge sampling circuit comprises a current transformer CT and a sampling capacitor Cs. By using the current transformer CT to sample the current of the resonant tank, and then by integrating the current of the resonant tank through the sampling capacitor Cs, charge is generated and the charge integration signal is obtained.

Figure 3:
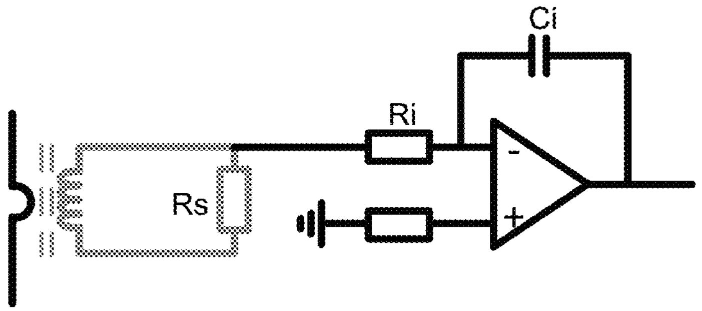
FIG. 3 is another one of the structural diagrams of a resonant tank charge sampling circuit in a specific embodiment of the present application.

Referring to FIG. 3, the second type of resonant tank charge sampling circuit comprises a current transformer CT, and a sampling resistor and an integration circuit with an operational amplifier. A voltage sampling signal of the current is obtained by using the current transformer CT and the sampling resistor, and then a charge integration signal is obtained by using the integration circuit with the operational amplifier. It can be understood that for the half-cycle control method, it is generally necessary to increase slope compensation to ensure the stability of charge control of the resonant-converter.

Figure 4:
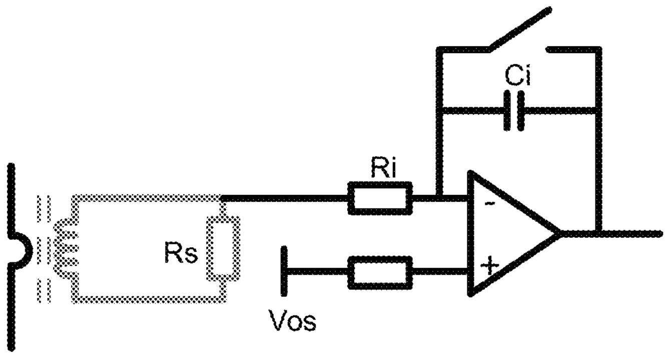
FIG. 4 is yet another one of the structural diagrams of a resonant tank charge sampling circuit in a specific embodiment of the present application.

FIG. 4 shows an implementation in which a bias voltage Vos is added at a non-inverting input end of the operational amplifier, and a reset switch is connected parallelly to an integrating capacitor Ci. The reset switch is turned off at the integrating half cycle, and is turned on at the non-integrating half cycle and the capacitor Ci is discharged to reset.

Figure 5:
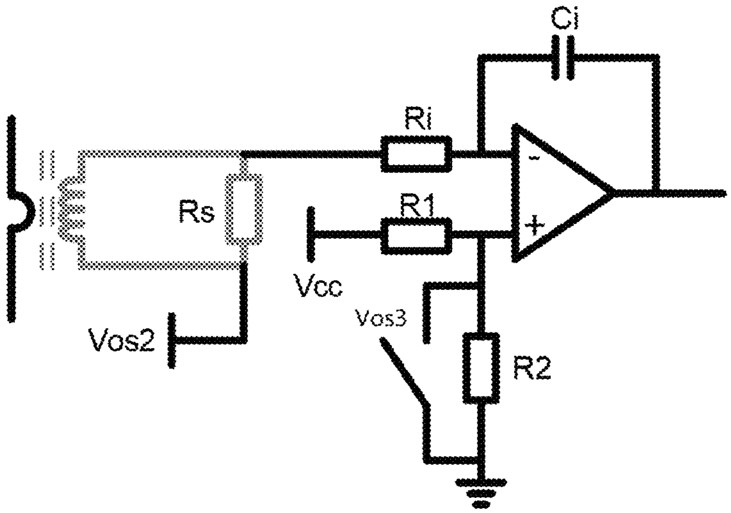
FIG. 5 is still another one of the structural diagrams of a resonant tank charge sampling circuit in a specific embodiment of the present application.

Another resonant tank charge sampling circuit is shown in FIG. 5, in which the current sampling voltage is added by the bias voltage Vos2 at first, the Vcc generates Vos3 through resistor division used for slope compensation, then Vos3–Vos2 determines the slope of the slope compensation. The reset switch is turned off at the integrating half cycle. Vos3 is generated by a voltage division resistor (i.e., R1 and R2 in FIG. 5), and Vos3 is the voltage at the connection point between R1 and R2. The reset switch is turned on at the non-integrating half cycle, the operational amplifier is in the comparator state, and the current sampling voltage discharges the integrating capacitor Ci.

The output of the resonant tank charge sampling circuit is $$\int_0^t k_{cur} \times I_p(t)dt + k_{slop} \times t,$$

where $I_p$ denotes current of a primary side resonant tank, $k_{cur}$ denotes a coefficient of current sampling and integration, $k_{slop}$ denotes a slope coefficient of slope compensation.

In an embodiment of the resonant converter dynamic control system of the present application, the control circuit comprises a calculation unit which includes an output voltage controller that is connected to the output voltage sampling circuit, the output voltage sampling circuit is used for transmitting the output voltage signal to the output voltage controller, and the output voltage controller is used for generating a first comparison reference value based on the output voltage signal and an output voltage reference value;

the calculation unit further includes an output current feedforward unit which is connected to the output current sampling circuit that is used for transmitting the output current signal to the output current feedforward unit, and the output current feedforward unit is used for generating a second comparison reference value based on the output current signal and an output current feedforward coefficient;

the calculation unit further includes a judgment feedforward unit which is connected to the output current sampling circuit that is used for transmitting an output current signal to the judgment feedforward unit, the judgment feedforward unit is used for judging whether the first comparison reference value or sum of the first comparison reference value and the second comparison reference value is smaller than a benchmark reference value when it is determined that the output current signal is switched from a light load mode to a heavy load mode or jumps out of a burst mode, and if it is, assigns the benchmark reference value to the first comparison reference value or the sum of the first comparison reference value and the second comparison reference value to obtain a third comparison reference value or a fourth comparison reference value;

the calculation unit is further used for calculating a target comparison reference value according to the third comparison reference value or the fourth comparison reference value.

For example, the output voltage controller generates a first comparison reference value Vc1 based on the output voltage and the output voltage reference value; the output current feedforward generates a second comparison reference value Vc2 according to the output current and a feedforward coefficient; the judgment feedforward judges at first whether the output current is switched from the light load mode to the heavy load mode, or whether the output current jumps out of the burst mode, if it is, when the output current is higher than a certain value Iout_set, judges whether Vc1 is smaller than the benchmark reference value Vc_set, or whether Vc1+Vc2 is smaller than the benchmark reference value Vc_set, and if it is, sets Vc1 directly as Vc_set, that is, assigns the benchmark reference value to the first comparison reference value to obtain the third comparison reference value, or sets Vc1+Vc2 as Vc_set, that is, assigns the benchmark reference value to the sum of the first comparison reference value and the second comparison reference value to obtain the fourth comparison reference value, the output voltage controller performs control on this basis to add Vc1 and Vc2 to output the target comparison reference value Vc to the comparator.

The access load is small in the light load mode; the access load is high in the heavy load mode.

Specifically, it is judged whether the first comparison reference value Vc1 is smaller than the benchmark reference value; if it is, the benchmark reference value is assigned to the first comparison reference value Vc1 to obtain the third comparison reference value (that is, the first comparison reference value Vc1 after the assignment); the target comparison reference value is calculated according to the third comparison reference value and the second comparison reference value Vc2, and the target comparison reference value is converted into the analog reference voltage.

Or, it is judged whether the sum of the first comparison reference value Vc1 and the second comparison reference value Vc2 is smaller than the benchmark reference value; if it is, the benchmark reference value is assigned to the sum of the first comparison reference value Vc1 and the second comparison reference value Vc2 to obtain the fourth comparison reference value (that is, the sum of the first comparison reference value Vc1 and the second comparison reference value Vc2 after the assignment); the target comparison reference value is calculated according to the fourth comparison reference value, and the target comparison reference value is converted into the analog reference voltage.

The output voltage reference value can be a preset value, the output current feedforward coefficient can be a preset coefficient, and an output current change rate feedforward coefficient can be a preset coefficient.

The control circuit further includes an analog output unit which is connected to the calculation unit that is used for transmitting the target comparison reference value to the analog output unit, and the analog output unit is used for receiving the target comparison reference value and converting the target comparison reference value to the analog reference voltage.

The control circuit further includes a comparator which is connected to the analog output unit and is used for receiving the analog reference voltage and a charge integration signal and performs comparison operation.

Seen as such, in the present application, the dynamic control performance of the resonant converter can be improved by acquiring an output voltage signal, an output current signal and a benchmark reference value, to generate a target comparison reference value and converting it into an analog reference voltage, and performing comparison between the analog reference voltage and the acquired charge integration signal of the resonant tank so as to compensate for difference between an input power and an output power in the dynamic regulation process, as well as power difference caused by output current sampling and control delay.

In an embodiment of the resonant converter dynamic control system of the present application, the control circuit further includes a pulse width modulation unit which is connected to the comparator, the comparator transmits a comparison result of the charge integration signal and the analog reference voltage to the pulse width modulation unit, and the pulse width modulation unit is used for generating the control signal based on the comparison result;

the pulse width modulation unit is further used for transmitting the control signal to an inverter circuit of the resonant converter, and the control signal is used for controlling power transmission of the resonant converter.

Specifically, the pulse width modulation unit transmits the control signal to a gate (a control end) of a switch of the inverter circuit of the resonant converter, controls on and off of the switch of the inverter circuit of the resonant converter, and then controls the power transmission of the resonant converter.

It can be seen that in the present application, a pulse control signal corresponding to the comparison result is generated by the pulse width modulation unit, that is, the control signal in the present application, which is used for controlling on and off of the switch of the inverter circuit of the resonant converter, and then controlling the power transmission of the resonant converter.

In an embodiment of the resonant converter dynamic control system of the present application, the resonant tank charge sampling circuit is used for detecting the current integration of the resonant tank in half cycle, and the resonant tank charge sampling circuit includes a slope compensation circuit, which is used for generating the charge integration signal by superposition the charge after current integration of the resonant tank in half cycle.

In an embodiment of the resonant converter dynamic control system of the present application, the control circuit further includes an input voltage sampling circuit which is connected to the calculation unit, the input voltage sampling circuit is used for acquiring an input voltage of the resonant converter and transmitting an input voltage sampling signal to the calculation unit, and the calculation unit is further used for adjusting the output current feedforward coefficient according to the input voltage sampling signal and the output voltage signal.

In an embodiment of the resonant converter dynamic control system of the present application, the calculation unit is further used for determining an estimated operating frequency of the resonant converter according to the input voltage sampling signal, the output voltage signal, the output current signal and a resonant tank parameter of the resonant converter;

the calculation unit is further used for adjusting the output current feedforward coefficient based on the estimated operating frequency, the input voltage sampling signal and the output voltage signal.

Specifically, according to the power balance, the average value of the current in the primary side resonant tank in half cycle is $$I_{pavg} = \frac{\mathrm{V}out \times Iout}{\mathrm{Vin}},$$

in the case of no sampled input voltage, that is, when the sampling circuit does not include the input voltage sampling circuit, in accordance with the resonant frequency fr of the LLC resonant converter in working, at that time $$I_{pavg} = \frac{Iout}{Ntx},$$

Ntx is the transformer turn ratio Np:Ns of the LLC resonant converter, then the corresponding integrated charge of the resonant tank current is $$k_{cur} \times \frac{Iout}{Ntx} \times Tr/2,$$

the output current feedforward coefficient can be $$\frac{k_{cur}}{Ntx} \times Tr/2,$$

but an appropriate coefficient can be obtained also by debugging, where $k_{cur}$ is a sampling coefficient related to the output current sampling circuit and the charge integrating circuit, where Vout represents the output voltage, Iout represents the output current, Vin represents the input voltage, and Tr represents the resonance period.

In addition, the sampling circuit can further include input voltage sampling, according to the power balance, calculate the average value of the current in the primary side resonant tank in half cycle to be $$I_{pavg} = \frac{\mathrm{V}out \times Iout}{\mathrm{Vin}},$$

then the output current feedforward coefficient can be $$\frac{k_{cur \times Vout}}{\mathrm{Vin}} \times Tr/2,$$

further, the operating frequency fs can be estimated based on the input voltage, the output voltage, the output current and the resonant tank parameter, the output current feedforward coefficient can be $$\frac{k_{cur \times Vout}}{\mathrm{Vin}} \times Ts/2,$$

where $k_{cur}$ is a sampling coefficient related to the output current sampling circuit and the charge integrating circuit, and the Ts represents an operating period.

Correspondingly, the benchmark reference value Vc_set can be set as $$\int_0^{Ts/2} k_{cur} \times I_p(t)dt + k_{slop} \times Ts/2, \text{ where } k_{cur}$$

is a sampling coefficient related to the output current sampling circuit and the charge integrating circuit, and $k_{slop}$ denotes a slope coefficient of slope compensation.

In an embodiment of the resonant converter dynamic control system of the present application, the resonant converter comprises an inverter circuit, a resonant tank and a rectifier circuit, the inverter circuit is a full-bridge circuit or a half-bridge circuit, and the rectifier circuit is a full-bridge circuit or a full-wave circuit, and the rectifier circuit contains a transformer for electrical isolation and/or voltage conversion.

Figure 6:
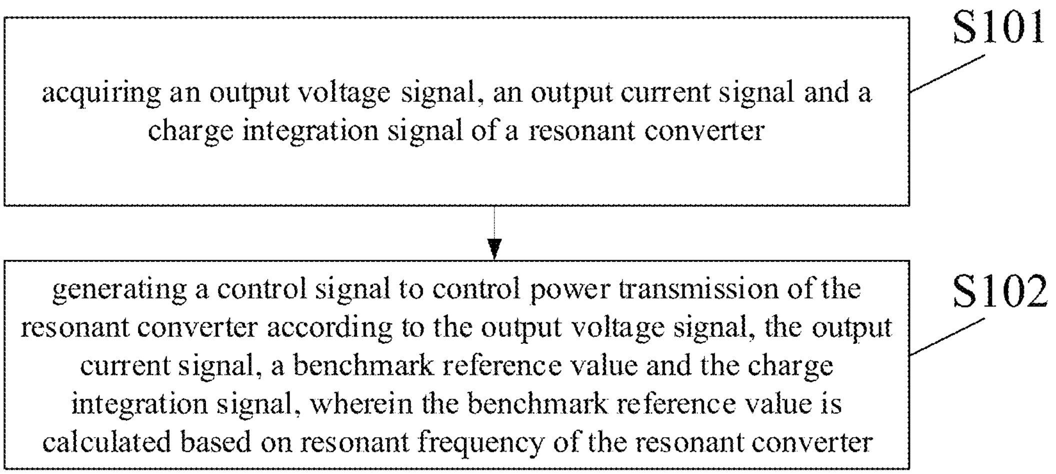
FIG. 6 is one of the schematic diagrams of a resonant converter dynamic control method in an embodiment of the present application.

In order to be able to effectively improve the dynamic control performance of the resonant converter, the present application provides an embodiment of the resonant converter dynamic control method. Referring to FIG. 6, the resonant converter dynamic control method specifically comprises the following contents:

- a step S101 of acquiring an output voltage signal, an output current signal and a charge integration signal of a resonant converter;
- a step S102 of generating a control signal to control power transmission of the resonant converter according to the output voltage signal, the output current signal, a benchmark reference value and the charge integration signal, wherein the benchmark reference value is calculated based on resonant frequency of the resonant converter.

It can be seen from the above description that the resonant converter dynamic control method provided in an embodiment of the present application can effectively improve the dynamic control performance of the resonant converter by adding the control of judgment feedforward of the benchmark reference value to compensate for difference between an input power and an output power in the dynamic regulation process, as well as power difference caused by output current sampling and control delay.

Figure 7:
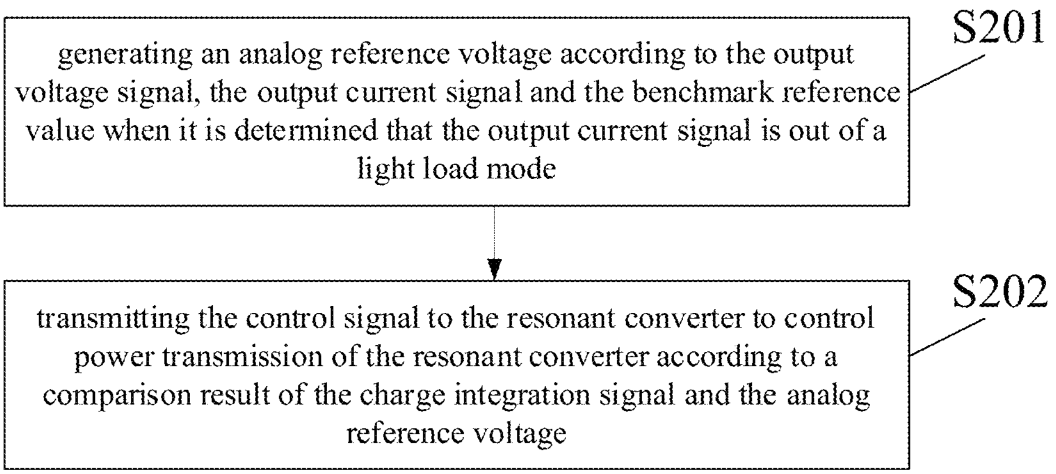
FIG. 7 is another one of the schematic diagrams of a resonant converter dynamic control method in an embodiment of the present application.

In an embodiment of the resonant converter dynamic control method of the present application, referring to FIG. 7, the step S102 described above includes:

- a step S201 of generating an analog reference voltage according to the output voltage signal, the output current signal and the benchmark reference value when it is determined that the output current signal is out of a light load mode;
- a step S202 of transmitting the control signal to the resonant converter to control power transmission of the resonant converter according to a comparison result of the charge integration signal and the analog reference voltage.

Figure 8:
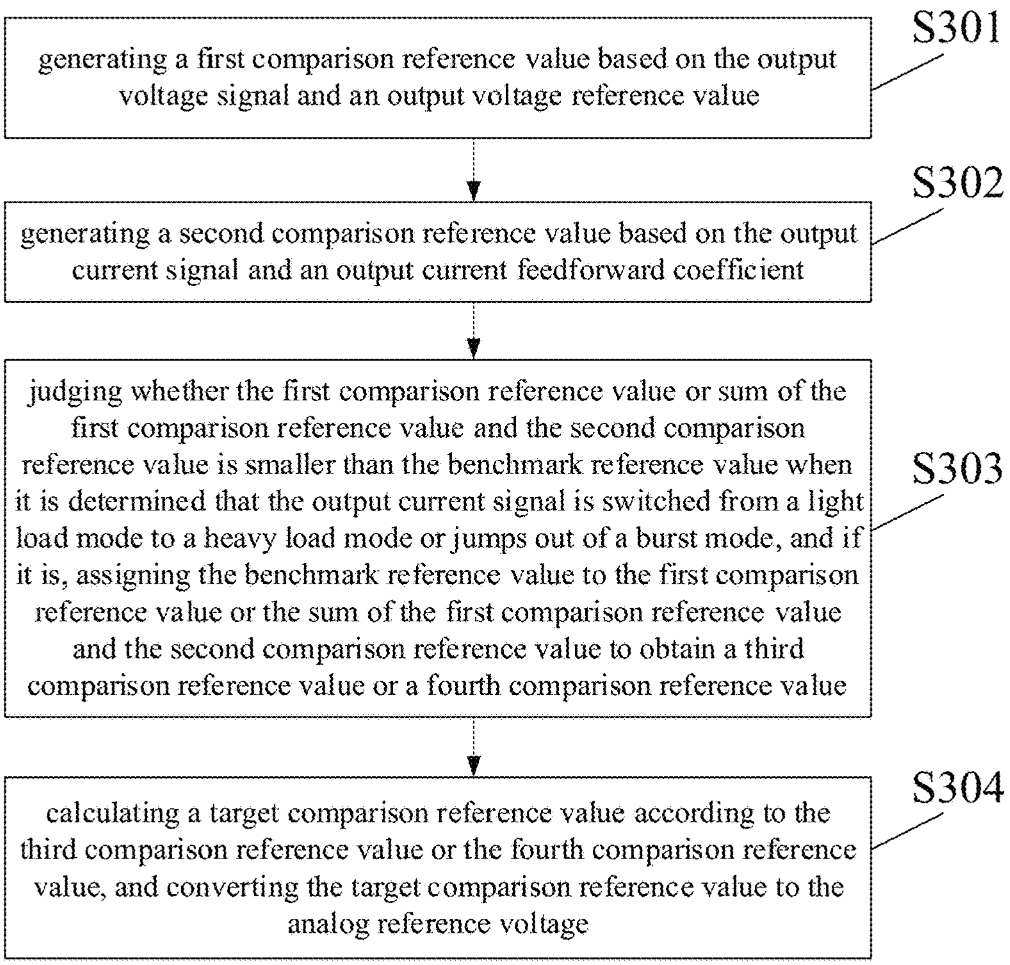
FIG. 8 is yet another one of the schematic diagrams of a resonant converter dynamic control method in an embodiment of the present application.

In an embodiment of the resonant converter dynamic control method of the present application, referring to FIG. 8, the step S201 described above includes:

- a step S301 of generating a first comparison reference value based on the output voltage signal and an output voltage reference value;
- a step S302 of generating a second comparison reference value based on the output current signal and an output current feedforward coefficient.

In a possible example, the output current feedforward coefficient can be a preset fixed value.

- a step S303 of judging whether the first comparison reference value or sum of the first comparison reference value and the second comparison reference value is smaller than the benchmark reference value when it is determined that the output current signal is switched from a light load mode to a heavy load mode or jumps out of a burst mode, and if it is, assigning the benchmark reference value to the first comparison reference value or the sum of the first comparison reference value and the second comparison reference value to obtain a third comparison reference value or a fourth comparison reference value;
- a step S304 of calculating a target comparison reference value according to the third comparison reference value or the fourth comparison reference value, and converting the target comparison reference value to the analog reference voltage.

For example, the output voltage controller generates a first comparison reference value Vc1 based on the output voltage and the output voltage reference value; the output current feedforward generates a second comparison reference value Vc2 according to the output current and a feedforward coefficient; the judgment feedforward judges at first whether the output current is switched from the light load mode to the heavy load mode, or whether the output current jumps out of the burst mode, if it is, when the output current is higher than a certain value Iout_set, judges whether Vc1 is smaller than the benchmark reference value Vc_set, or whether Vc1+Vc2 is smaller than the benchmark reference value Vc_set, and if it is, sets Vc1 directly as Vc_set, that is, assigns the benchmark reference value to the first comparison reference value to obtain the third comparison reference value, or sets Vc1+Vc2 as Vc_set, that is, assigns the benchmark reference value to the sum of the first comparison reference value and the second comparison reference value to obtain the fourth comparison reference value, the output voltage controller performs control on this basis to add Vc1 and Vc2 to output the target comparison reference value Vc to the comparator.

In an embodiment of the resonant converter dynamic control method of the present application, before the generating a second comparison reference value based on the output current signal and an output current feedforward coefficient, the method further comprises: adjusting the output current feedforward coefficient according to the input voltage sampling signal and the output voltage signal of the resonant converter.

Figure 9:
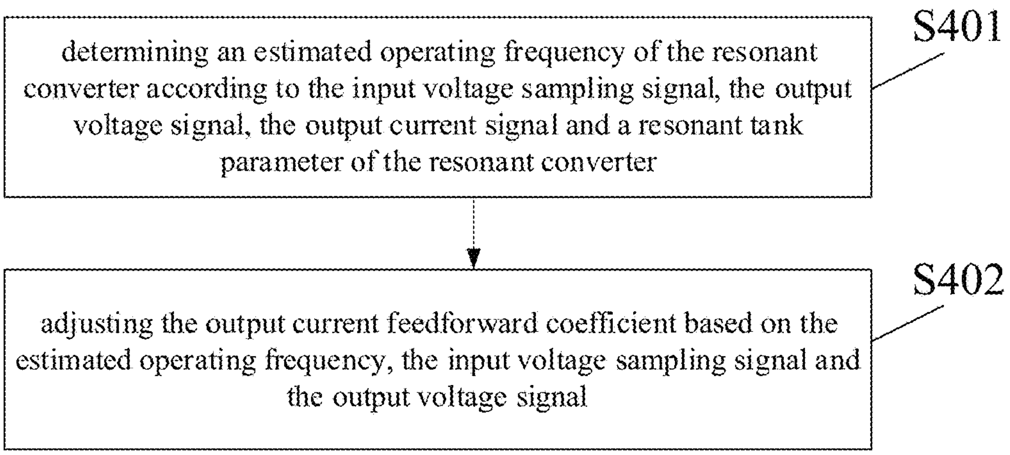
FIG. 9 is still another one of the schematic diagrams of a resonant converter dynamic control method in an embodiment of the present application.

In an embodiment of the resonant converter dynamic control method of the present application, referring to FIG. 9, the method further comprises:

- a step S401 of determining an estimated operating frequency of the resonant converter according to the input voltage sampling signal, the output voltage signal, the output current signal and a resonant tank parameter of the resonant converter;
- a step S402 of adjusting the output current feedforward coefficient based on the estimated operating frequency, the input voltage sampling signal and the output voltage signal.

Alternatively, according to the power balance, the average value of the current in the primary side resonant tank in half cycle is $$I_{pavg} = \frac{\mathrm{V}out \times Iout}{\mathrm{Vin}},$$

without sampling the input voltage, in accordance with the resonant frequency fr of the LLC resonant converter in working, at that time $$I_{pavg} = \frac{Iout}{Ntx},$$

Ntx is the transtormer turn ratio Np:Ns of the LLC resonant converter, then the corresponding integrated charge of the resonant tank current is $$k_{cur} \times \frac{Iout}{Ntx} \times Tr/2,$$

the output current feedforward coefficient can be $$\frac{k_{cur}}{Ntx} \times Tr/2,$$

but an appropriate coefficient can be obtained also by debugging, where $k_{cur}$ is a sampling coefficient related to the output current sampling circuit and the charge integrating circuit.

In addition, the sampling circuit can further include input voltage sampling, according to the power balance, calculate the average value of the current in the primary side resonant tank in half cycle to be $$I_{pavg} = \frac{Vout \times Iout}{Vin},$$

then the output current feedforward coefficient can be $$\frac{k_{cur \times Vout}}{Vin} \times Tr/2,$$

further, the operating frequency fs can be estimated based on the input voltage, the output voltage, the output current and the resonant tank parameter, the output current feedforward coefficient can be $$\frac{k_{cur \times Vout}}{Vin} \times Ts/2,$$

where $k_{cur}$ is a sampling coefficient related to the output current sampling circuit and the charge integrating circuit.

In terms of hardware, in order to be able to effectively improve the dynamic control performance of the resonant converter, the present application provides an embodiment of an electronic device for implementing all or part of the resonant converter dynamic control method described above, and the electronic device specifically includes the following contents:

a processor, a memory, a communications interface, and a bus; wherein the processor, the memory, and the communications interface complete communication with each other through the bus; the communications interface is used for implementing information transmission between the resonant converter dynamic control system and a core business system, a user terminal and the related database and other related equipment; the processor includes a control circuit in any of the resonant converter dynamic control systems involved in the foregoing embodiment, and the processor may be a logic controller. The logic controller may be a desktop computer, a tablet computer, and a mobile terminal, etc., and the embodiment is not limited to this. In the present embodiment, the logic controller can be implemented with reference to the embodiment of the resonant converter dynamic control method and the embodiment of the resonant converter dynamic control system, the contents of which are incorporated herein and will not be repeated.

Figure 10:
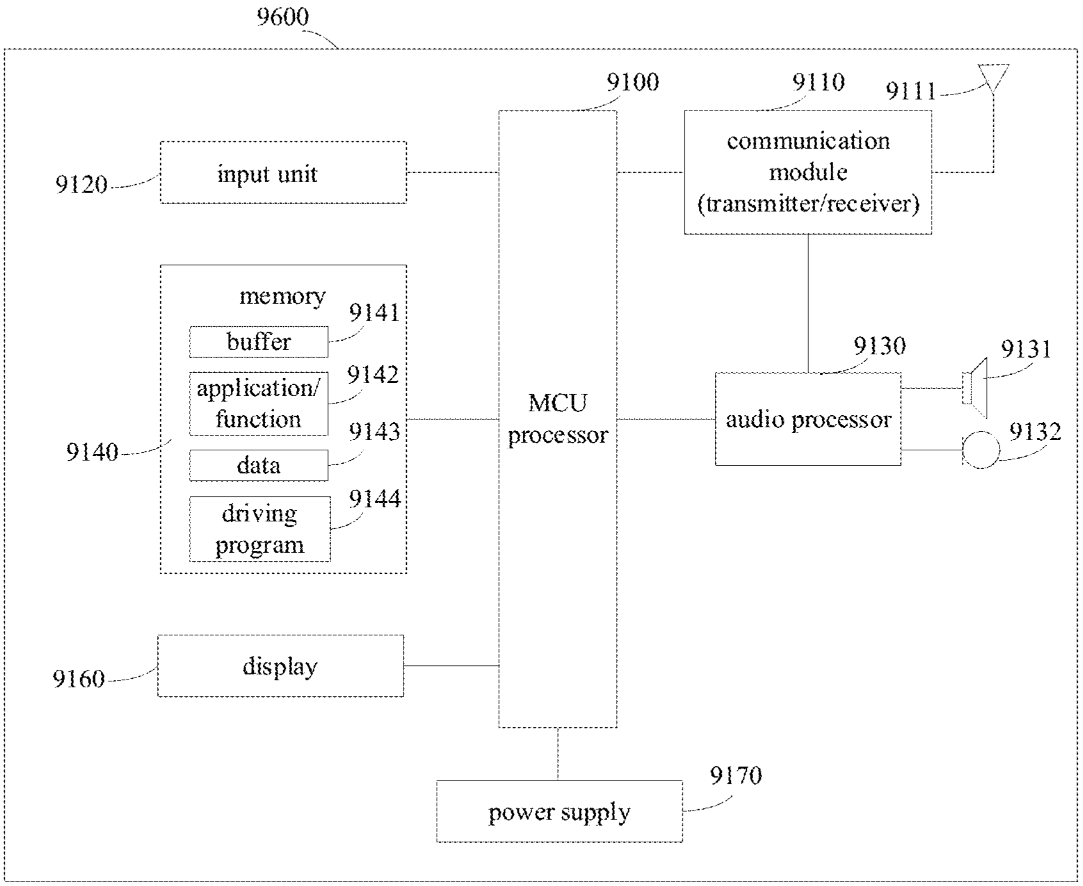
FIG. 10 is a structural schematic diagram of an electronic device in an embodiment of the present application.

FIG. 10 is a schematic block diagram of system configuration of an electronic device 9600 according to an embodiment of the present application. As shown in FIG. 10, the electronic device 9600 may include an MCU processor 9100 and a memory 9140; the memory 9140 is coupled to the MCU processor 9100. The MCU processor 9100 in the above embodiment can also be replaced with a DSP (Digital Signal Processing/Processor) processor/chip, an MPU (Micro Processor Unit) processor/chip, or a processor/chip that integrates at least two of the MCU, DSP, and MPU. It is worth noting that FIG. 10 is exemplary; other types of structures may also be used in addition to or instead of the structure to implement telecommunications functions or other functions.

In an embodiment, the function of the resonant converter dynamic control method may be integrated into the MCU processor 9100 or another existing MCU. Wherein the MCU processor 9100 may be configured to perform the following control of:

a step S101 of acquiring an output voltage signal, an output current signal and a charge integration signal of a resonant converter;

a step S102 of generating a control signal to control power transmission of the resonant converter according to the output voltage signal, the output current signal, a benchmark reference value and the charge integration signal, wherein the benchmark reference value is calculated based on resonant frequency of the resonant converter.

It can be seen from the above description that the electronic device provided in an embodiment of the present application can effectively improve the dynamic control performance of the resonant converter by adding the feedforward control of the output current change rate to compensate for difference between an input power and an output power in the dynamic regulation process, as well as power difference caused by output current sampling and control delay.

In another embodiment, the resonant converter dynamic control system can be configured separately from the MCU processor 9100. For example, the resonant converter dynamic control system can be configured as a chip connected to the MCU processor 9100, and the function of the resonant converter dynamic control method can be realized through the control of the central processor.

As shown in FIG. 10, the electronic device 9600 may further include a communication module 9110, an input unit 9120, an audio processor 9130, a display 9160, and a power supply 9170. It is worth noting that the electronic device 9600 is not necessarily required to include all of the components shown in FIG. 10; in addition, the electronic device 9600 may further include components not shown in FIG. 10, with reference to the prior art.

As shown in FIG. 10, the MCU processor 9100, sometimes referred to as a controller or an operational control, may include a microprocessor or other processor apparatuses and/or logic apparatuses, the MCU processor 9100 receives inputs and controls operation of the components of the electronic device 9600.

Where, the memory 9140 may be, for example, one or more of a buffer, a flash memory, a hard drive, a removable medium, a volatile memory, a non-volatile memory, or other suitable apparatuses. The above-described failure-related information may be stored, and in addition, a program for executing the relevant information may be stored. And the MCU processor 9100 may execute the program stored in the memory 9140 to implement information storage or processing and the like.

The input unit 9120 provides an input to the MCU processor 9100. The input unit 9120 is, for example, a key or a touch input apparatus. The power supply 9170 is used to provide electric power to the electronic device 9600. The display 9160 is used for displaying objects to be displayed, such as images and text, and the like. The display may be, for example, an LCD display, but is not limited thereto.

The memory 9140 may be a solid state memory such as read only memory (ROM), random access memory (RAM), SIM card, or the like. The memory may also be such a memory that it saves information even when power is off, on which data can be selectively erased and more data is set, and an example of which is sometimes referred to as an EPROM or the like. The memory 9140 may also be some other types of apparatuses. The memory 9140 includes a buffer memory 9141 (sometimes referred to as a buffer). The memory 9140 may include an application/function storage unit 9142 for storing application programs and function programs or a flow for performing operation of an electronic device 9600 by the MCU processor 9100.

The memory 9140 may also include a data storage unit 9143 for storing data, such as contacts, digital data, pictures, sounds, and/or any other data used by the electronic device. A drive program storage unit 9144 of the memory 9140 may include various drive programs of the electronic device for communication functions and/or for executing other functions of the electronic device, such as a messaging application, an address book application, and the like.

The communication module 9110 is a transmitter/receiver 9110 that transmits and receives signals via an antenna 9111. The communication module (transmitter/receiver) 9110 is coupled to the MCU processor 9100 to provide input signals and to receive output signals, which may be the same as in the case of conventional mobile communication terminals.

Based on different communication technologies, a plurality of communication modules 9110, such as a cellular network module, a Bluetooth module, and/or a wireless local area network module and the like may be provided in the same electronic device. The communication module (transmitter/receiver) 9110 is also coupled to a speaker 9131 and a microphone 9132 via an audio processor 9130 to provide an audio output via the speaker 9131, and to receive an audio input from the microphone 9132, thereby implementing the usual telecommunications functions. The audio processor 9130 may include any suitable buffer, decoder, amplifier, or the like. In addition, the audio processor 9130 is also coupled to the MCU processor 9100 so that sound can be recorded on the local machine by the microphone 9132, and the sound stored on the local machine can be played through the speaker 9131.

The disclosure adopts specific embodiments to explain the principle and implementation way of the disclosure. The above embodiments are described merely for helping to understand the method and core concept of the disclosure; in addition, a person skilled in the art can, on the basis of the concept of the disclosure, make modifications to both of the specific embodiments and application scope. In conclusion, contents disclosed herein should not be understood as limitation to the disclosure.

The invention claimed is:

1. A resonant converter dynamic control system, wherein comprising a resonant converter, a sampling circuit connected to the resonant converter, and a control circuit connected to the sampling circuit and the resonant converter respectively;

the sampling circuit is used for acquiring and transmitting an output voltage signal, an output current signal and a charge integration signal of the resonant converter to the control circuit;

the control circuit is used for generating a control signal to control power transmission of the resonant converter according to the output voltage signal, the output current signal, a benchmark reference value and the charge integration signal, wherein the benchmark reference value is calculated based on resonant frequency of the resonant converter.

2. The resonant converter dynamic control system according to claim 1, wherein, the control circuit is specifically used for generating an analog reference voltage according to the output voltage signal, the output current signal and the benchmark reference value when it is determined that the output current signal is out of a light load mode; and for transmitting the control signal to the resonant converter to control power transmission of the resonant converter according to a comparison result of the charge integration signal and the analog reference voltage.

3. The resonant converter dynamic control system according to claim 1, wherein, the sampling circuit includes: an output voltage sampling circuit, an output current sampling circuit and a resonant tank charge sampling circuit;

an input end of the output voltage sampling circuit and an input end of the output current sampling circuit are respectively connected to an output end of the resonant converter, and the resonant tank charge sampling circuit is connected to the resonant tank of the resonant converter.

4. The resonant converter dynamic control system according to claim 3, wherein, the resonant tank charge sampling circuit is used for detecting the current integration of the resonant tank in half cycle, and the resonant tank charge sampling circuit includes a slope compensation circuit, the charge integration signal is obtained by adding the slope compensation and charge obtained by current integration of the resonant tank in half cycle.

5. The resonant converter dynamic control system according to claim 3, wherein, the control circuit comprises a calculation unit which includes an output voltage controller that is connected to the output voltage sampling circuit, the output voltage sampling circuit is used for transmitting the output voltage signal to the output voltage controller, and the output voltage controller is used for generating a first comparison reference value based on the output voltage signal and an output voltage reference value;

the calculation unit further includes an output current feedforward unit which is connected to the output current sampling circuit that is used for transmitting the output current signal to the output current feedforward unit, and the output current feedforward unit is used for generating a second comparison reference value based on the output current signal and an output current feedforward coefficient;

the calculation unit further includes a judgment feedforward unit which is connected to the output current sampling circuit that is used for transmitting an output current signal to the judgment feedforward unit, the judgment feedforward unit is used for judging whether the first comparison reference value or sum of the first comparison reference value and the second comparison reference value is smaller than a benchmark reference value when it is determined that the output current signal is switched from a light load mode to a heavy load mode or jumps out of a burst mode, and if it is, assigns the benchmark reference value to the first comparison reference value or the sum of the first comparison reference value and the second comparison reference value to obtain a third comparison reference value or a fourth comparison reference value;

the calculation unit is further used for calculating a target comparison reference value according to the third comparison reference value or the fourth comparison reference value.

6. The resonant converter dynamic control system according to claim 5, wherein, the control circuit further includes an analog output unit which is connected to the calculation unit that is used for transmitting the target comparison reference value to the analog output unit, and the analog output unit is used for receiving the target comparison reference value and converting the target comparison reference value to the analog reference voltage.

7. The resonant converter dynamic control system according to claim 6, wherein, the control circuit further includes a comparator which is connected to the analog output unit and is used for receiving the analog reference voltage and the charge integration signal and performs comparison operation.

8. The resonant converter dynamic control system according to claim 7, wherein, the control circuit further includes a pulse width modulation unit which is connected to the comparator, the comparator transmits a comparison result of the charge integration signal and the analog reference voltage to the pulse width modulation unit, and the pulse width modulation unit is used for generating the control signal based on the comparison result;

the pulse width modulation unit is further used for transmitting the control signal to an inverter circuit of the resonant converter, and the control signal is used for controlling power transmission of the resonant converter.

9. The resonant converter dynamic control system according to claim 5, wherein, the control circuit further includes an input voltage sampling circuit which is connected to the calculation unit, the input voltage sampling circuit is used for acquiring an input voltage of the resonant converter and transmitting an input voltage sampling signal to the calculation unit, and the calculation unit is further used for adjusting the output current feedforward coefficient according to the input voltage sampling signal and the output voltage signal.

10. The resonant converter dynamic control system according to claim 5, wherein, the control circuit further includes an input voltage sampling circuit which is connected to the calculation unit, the input voltage sampling circuit is used for acquiring an input voltage of the resonant converter and transmitting an input voltage sampling signal to the calculation unit, and the calculation unit is further used for determining an estimated operating frequency of the resonant converter according to the input voltage sampling signal, the output voltage signal, the output current signal and a resonant tank parameter of the resonant converter;

the calculation unit is further used for adjusting the output current feedforward coefficient based on the estimated operating frequency, the input voltage sampling signal and the output voltage signal.

11. The resonant converter dynamic control system according to claim 1, wherein, the resonant converter comprises an inverter circuit, a resonant tank and a rectifier circuit, the inverter circuit is a full-bridge circuit or a half-bridge circuit, and the rectifier circuit is a full-bridge circuit or a full-wave circuit, and the rectifier circuit contains a transformer for electrical isolation and/or voltage conversion.

12. A resonant converter dynamic control method, wherein comprising:

acquiring an output voltage signal, an output current signal and a charge integration signal of a resonant converter;

generating a control signal to control power transmission of the resonant converter according to the output voltage signal, the output current signal, a benchmark reference value and the charge integration signal, wherein the benchmark reference value is calculated based on resonant frequency of the resonant converter.

13. The resonant converter dynamic control method according to claim 12, wherein, the generating a control signal to control power transmission of the resonant converter according to the output voltage signal, the output current signal, an output current change rate and the charge integration signal, includes:

generating an analog reference voltage according to the output voltage signal, the output current signal and the benchmark reference value when it is determined that the output current signal is out of a light load mode;

transmitting the control signal to the resonant converter to control power transmission of the resonant converter according to a comparison result of the charge integration signal and the analog reference voltage.

14. The resonant converter dynamic control method according to claim 13, wherein, the generating an analog reference voltage according to the output voltage signal, the output current signal and the benchmark reference value when it is determined that the output current signal is out of a light load mode, includes:

generating a first comparison reference value based on the output voltage signal and an output voltage reference value;

generating a second comparison reference value based on the output current signal and an output current feedforward coefficient;

judging whether the first comparison reference value or sum of the first comparison reference value and the second comparison reference value is smaller than the benchmark reference value when it is determined that the output current signal is switched from a light load mode to a heavy load mode or jumps out of a burst mode, and if it is, assigning the benchmark reference value to the first comparison reference value or the sum of the first comparison reference value and the second comparison reference value to obtain a third comparison reference value or a fourth comparison reference value;

calculating a target comparison reference value according to the third comparison reference value or the fourth comparison reference value, and converting the target comparison reference value to the analog reference voltage.

15. The resonant converter dynamic control method according to claim 14, wherein further comprising, before the generating a second comparison reference value based on the output current signal and an output current feedforward coefficient, adjusting the output current feedforward coefficient according to the input voltage sampling signal and the output voltage signal of the resonant converter.

16. The resonant converter dynamic control method according to claim 14, wherein further comprising, before the generating a second comparison reference value based on the output current signal and an output current feedforward coefficient, determining an estimated operating frequency of the resonant converter according to the input voltage sampling signal, the output voltage signal, the output current signal of the resonant converter and a resonant tank parameter of the resonant converter;

adjusting the output current feedforward coefficient based on the estimated operating frequency, the input voltage sampling signal and the output voltage signal.

17. An electronic device, comprising a memory, a processor, and a computer program stored on the memory and executable on the processor, wherein, the processor, when executing the program, implements steps of:

acquiring an output voltage signal, an output current signal and a charge integration signal of a resonant converter;

generating a control signal to control power transmission of the resonant converter according to the output voltage signal, the output current signal, a benchmark reference value and the charge integration signal, wherein the benchmark reference value is calculated based on resonant frequency of the resonant converter.

* * * * *